United States Patent
Tiwari

(10) Patent No.: US 8,885,468 B2
(45) Date of Patent: Nov. 11, 2014

(54) APPARATUSES AND METHODS FOR ACCESS POINT NAME (APN) BASED CONGESTION CONTROL DURING A PACKET DATA PROTOCOL (PDP) CONTEXT ACTIVATION PROCEDURE

(75) Inventor: Kundan Tiwari, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 191 days.

(21) Appl. No.: 13/310,305

(22) Filed: Dec. 2, 2011

(65) Prior Publication Data
US 2012/0170453 A1    Jul. 5, 2012

Related U.S. Application Data

(60) Provisional application No. 61/428,325, filed on Dec. 30, 2010, provisional application No. 61/431,937, filed on Jan. 12, 2011.

(51) Int. Cl.
*H04L 12/26* (2006.01)
*H04W 76/02* (2009.01)

(52) U.S. Cl.
CPC .......... *H04W 76/027* (2013.01); *H04W 76/022* (2013.01)
USPC ........................................................ 370/230

(58) Field of Classification Search
None
See application file for complete search history.

(56) References Cited

U.S. PATENT DOCUMENTS

| | | | |
|---|---|---|---|
| 7,366,093 B2 * | 4/2008 | Alfano et al. ................. | 370/229 |
| 2005/0221770 A1 | 10/2005 | Shipshock | |
| 2011/0296039 A1 * | 12/2011 | Deu-Ngoc et al. ............ | 709/228 |
| 2012/0002545 A1 * | 1/2012 | Watfa et al. ................... | 370/235 |

FOREIGN PATENT DOCUMENTS

| | | |
|---|---|---|
| CN | 101001184 A | 7/2007 |
| CN | 101001262 A | 7/2007 |
| EP | 1 667 400 A1 | 6/2006 |
| JP | 2011-504020 A | 1/2011 |
| WO | WO 03/084262 A1 | 10/2003 |
| WO | WO 2009/062302 A1 | 5/2009 |

OTHER PUBLICATIONS

Huawei: "GGSN Overload Control"; 3GPP TSG CT4 Meeting #51, Jacksonvile, U.S. Nov. 15-19, 2010; C4-102925; 11 pages.*
Nokia Siemens Networks et al: "Rejection due to per APN congestion"; Cl-105178; 3GPP TSG-CT WG1 Meeting #67; Barcelona, Spain, Oct. 11-15, 2010; 10 pages.*

(Continued)

*Primary Examiner* — Andrew Lai
*Assistant Examiner* — Mario Malcolm
(74) *Attorney, Agent, or Firm* — Birch, Stewart, Kolasch & Birch, LLP

(57) ABSTRACT

A mobile communication device wirelessly connected to a service network with a default Packet Data Protocol (PDP) context active for an Access Point Name (APN) is provided. In the mobile communication device, a wireless module performs wireless transmissions and receptions to and from a service network, and a controller module transmits a request message for activating a secondary PDP context associated with the APN to the service network via the wireless module. Also, the controller module receives a rejection message indicating no resource available or congestion for the APN and a value of a back-off timer from the service network via the wireless module, and retransmits the request message to the service network via the wireless module in response to the value of the back-off timer being zero.

12 Claims, 11 Drawing Sheets

(56) References Cited

OTHER PUBLICATIONS

3GPP ("Technical Specification Group Services and System Aspects; General Packet Radio Service (GPRS); Service description; Stage 2 (Release 10)" pp. 21-29; 57-59; 191-225; and 249, published Sep. 29, 2010.*

Nokia Siemens Networks et al: "Rejection due to per APN congestion"; C1-105178; 3GPP TSG-CT WG1 Meeting #67; Barcelona, Spain, Oct. 11-15, 2010; 10 pages.

Yi-Bing Lin et al: "IP connectivity for gateway GPRS support node", IEEE Wireless Communications, IEEE Service Center, Piscataway, NJ, US, vol. 12, No. 1, Feb. 1, 2005, pp. 37-46.

3GPP TS 24.008 V10.1.0, 3rd Generation Partnership Project; Technical Specification Group Core Network and Terminals; Mobile radio interface Layer 3 specification; Core network protocols; Stage 3 (Release 10), Dec. 2010, 30 pages.

HTC, "Handling of secondary PDP context activation procedure in case of APN congestion", 3GPP TSG-CT WG1 Meeting #70, C1-111513, Feb. 21-25, 2011, 10 pages.

Huawei, "GGSN overload control", 3GPP TSG CT4 Meeting #50bis, C4-102494, Oct. 11-15, 2010, 13 pages.

Nokia Siemens Network et al., "Rejection due to per APN congestion", 3GPP TSG-CT WG1 Meeting #67, C1-105163, Oct. 11-15, 2010, 13 pages.

Nokia Siemens Network et al.,"Rejection due to per APN congestion", 3GPP TSG-CT WG1 Meeting #67, C1-105135, Oct. 11-15, 2010, 4 pages.

* cited by examiner

APPARATUSES AND METHODS FOR ACCESS POINT NAME (APN) BASED CONGESTION CONTROL DURING A PACKET DATA PROTOCOL (PDP) CONTEXT ACTIVATION PROCEDURE

CROSS REFERENCE TO RELATED APPLICATIONS

This Application claims priority of U.S. Provisional Application No. 61/428,325, filed on Dec. 30, 2010, and the entirety of which is incorporated by reference herein. This Application also claims priority of U.S. Provisional Application No. 61/431,937, filed on Jan. 12, 2011, and the entirety of which is incorporated by reference herein.

BACKGROUND OF THE INVENTION

1. Field of the Invention

The invention generally relates to network congestion controls, and more particularly, to apparatuses and methods for Access Point Name (APN) based congestion control during a Packet Data Protocol (PDP) context activation procedure.

2. Description of the Related Art

In a typical mobile communication environment, a user equipment (UE), including a mobile telephone (also known as a cellular or cell phone), a laptop computer with wireless communications capability, or a personal digital assistant (PDA) etc., may communicate voice and/or data signals with one or more service networks. The wireless communications between the UE and the service networks may be performed using various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced technology, and others.

Take the Long Term Evolution (LTE) technology in compliance with the 3GPP TS 23.060 specification, v10.2.0 (referred to herein as the TS 23.060 specification) and the 3GPP TS 24.008 specification, v10.1.0 (referred to herein as the 24.008 specification) as an example. Before accessing a service, the UE has to perform a PDP context activation procedure to activate a default PDP context to the Serving GPRS Support Node (SGSN) and a specific Gateway GPRS Support Node (GGSN), which can support the service. To begin the PDP context activation procedure, the UE transmits an ACTIVATE PDP CONTEXT REQUEST message to the service network to request for the activation of a default PDP context for the service. As shown in FIG. 1, if the service network decides to accept the request, it replies to the UE with an ACTIVATE PDP CONTEXT ACCEPT message which comprises the configurations for activating the PDP context, and the PDP context activation procedure ends successfully. Otherwise, as shown in FIG. 2, if congestion occurs in the APN associated with the requested PDP context, the service network replies to the UE with an ACTIVATE PDP CONTEXT REJECT message which comprises a rejection cause with a cause value #26 (indicating insufficient resources) and a value of a back-off timer. When receiving the ACTIVATE PDP CONTEXT REJECT message, the UE starts the back-off timer with the received value and does not initiate any subsequent activation of the PDP context for the rejected APN until the back-off timer expires or the subscriber identity card coupled to/in the UE is replaced or removed.

BRIEF SUMMARY OF THE INVENTION

In one aspect of the invention, a mobile communication device wirelessly connected to a service network with a default PDP context active for an APN is provided. The mobile communication device comprises a wireless module and a controller module. The wireless module performs wireless transmissions and receptions to and from a service network. The controller module transmits a request message for activating a secondary PDP context associated with the APN to the service network via the wireless module, and receives a rejection message indicating no resource available or congestion for the APN and a value of a back-off timer from the service network via the wireless module. Also, the mobile communication device retransmits the request message to the service network via the wireless module in response to the value of the back-off timer being zero.

In another aspect of the invention, an APN-based congestion control method for a mobile communication device wirelessly connected to a service network with a default PDP context active for an APN is provided. The APN-based congestion control method comprises the steps of transmitting a request message for activating a secondary PDP context associated with the APN to the service network, receiving a rejection message indicating no resource available or congestion for the APN and a value of a back-off timer from the service network, and retransmitting the request message to the service network in response to the value of the back-off timer being zero.

In yet another aspect of the invention, a mobile communication device comprising a wireless module and a controller module is provided. The wireless module performs wireless transmissions and receptions to and from a service network. The controller module transmits a first request message for activating a default or secondary PDP context associated with an APN to the service network via the wireless module, and starts a back-off timer with a value in response to receiving a rejection message corresponding to the first request message from the service network via the wireless module. Also, the controller module receives a second request message for activating a default or secondary PDP context associated with the APN from the service network via the wireless module when the back-off timer is running, and transmits a response message corresponding to the second request message to the service network via the wireless module.

In still another aspect of the invention, an APN-based congestion control method for a mobile communication device during a PDP context activation procedure is provided. The APN-based congestion control method comprises the steps of transmitting a first request message to activate a default or secondary PDP context associated with an APN to the service network, starting a back-off timer with a value in response to receiving a rejection message corresponding to the first request message from the service network, receiving a second request message to activate a default or secondary PDP context associated with the APN from the service network when the back-off timer is running, and transmitting a response message corresponding to the second request message to the service network.

Other aspects and features of the present invention will become apparent to those with ordinarily skill in the art upon review of the following descriptions of specific embodiments of apparatuses and methods for APN-based congestion control during a PDP context activation procedure.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. Note that the 3GPP specifications described herein are used to teach the spirit of the invention, and the invention is not limited thereto.

Figure 1:
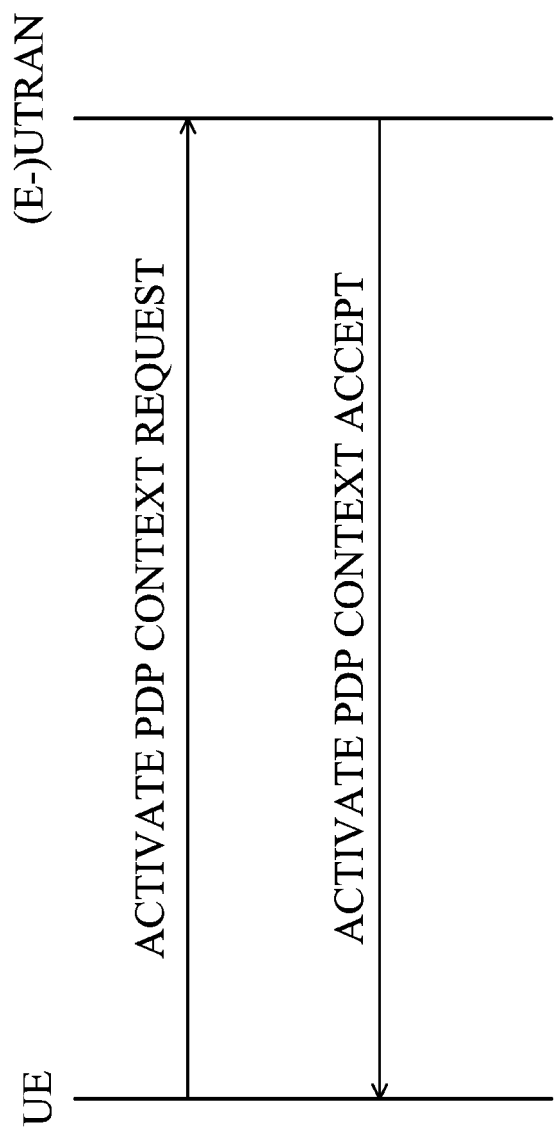
FIG. 1 is a message sequence chart illustrating a successful PDP context activation procedure.
Figure 2:
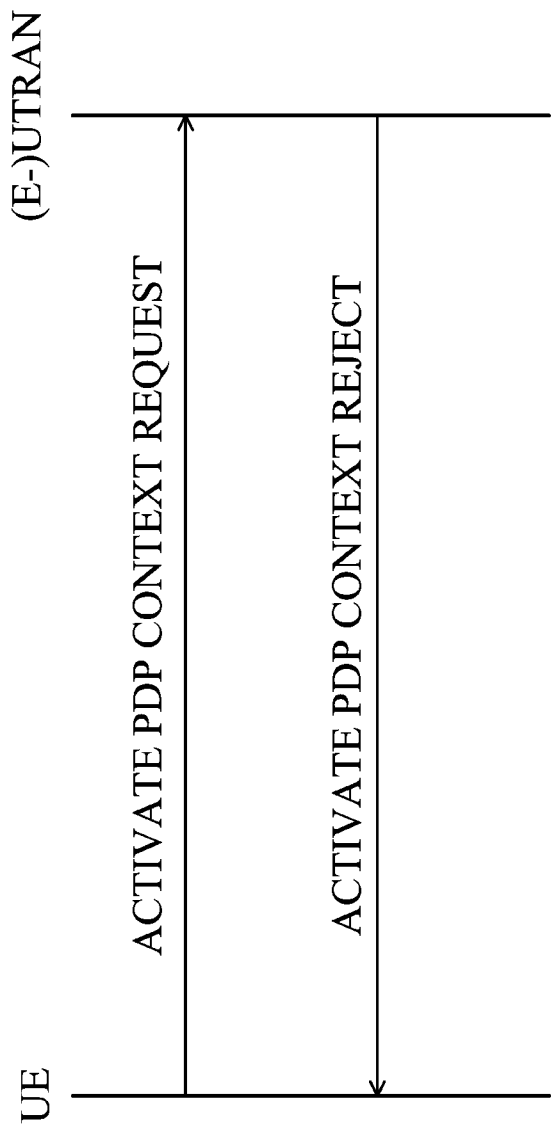
FIG. 2 is a block diagram illustrating an unsuccessful PDP context activation procedure.

It is noted that, in addition to the successful PDP context activation procedure as shown in FIG. 1 and the unsuccessful PDP context activation procedure as shown in FIG. 2, there may be a situation where a default PDP context is already active for an APN before the congestion occurs and the UE subsequently transmits another request for activating a secondary PDP context for the APN after the occurrence of the congestion. The service network rejects the request since the APN is congested. However, according to the TS 23.060 specification and the 24.008 specification, the behavior of the UE is not defined for such a rejected request, and problems, such as indeterminate behavior of the UE, may occur. Also, there may be a situation where the UE receives a network initiated request for activating a default or secondary PDP context for an APN with a corresponding back-off timer running. Similarly, according to the TS 23.060 specification and the 24.008 specification, the behavior of the UE is not defined for the reception of the network initiated request, and problems, such as indeterminate behavior of the UE, may occur.

Figure 3:
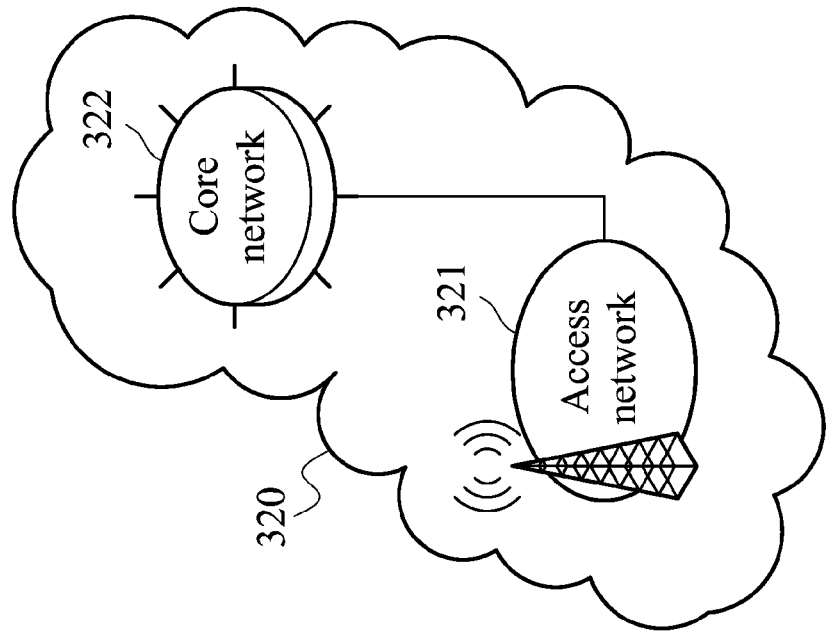
FIG. 3 is a block diagram illustrating a mobile communication environment according to an embodiment of the invention.
Figure 3:
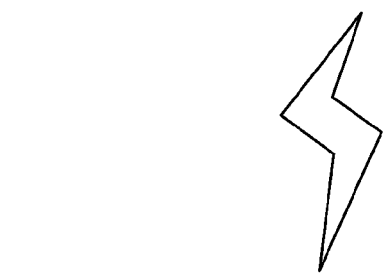
Figure 3:
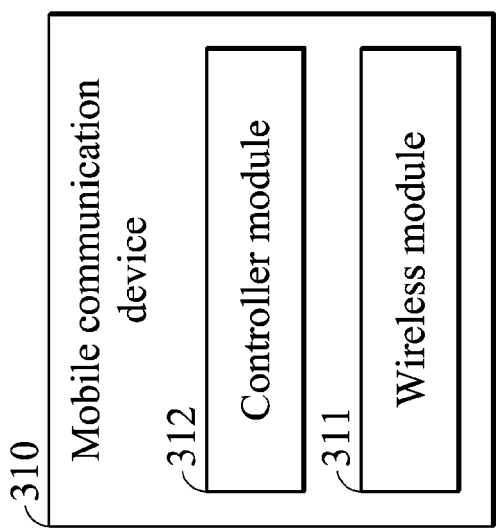

In order to solve the aforementioned problems, the invention provides apparatuses and methods for APN-based congestion control during a PDP context activation procedure. FIG. 3 is a block diagram illustrating a mobile communication environment according to an embodiment of the invention. In the mobile communication environment 300, the mobile communication device 310 is wirelessly connected to the service network 320 for obtaining wireless services. The service network 320 may comprise an access network 321 and a core network 322, wherein the access network 321 may be a Universal Terrestrial Radio Access Network (UTRAN) in the WCDMA technology or an E-UTRAN (Evolved-UTRAN) in the LTE/LTE-Advanced technology, and the core network 322 may be a GPRS core in the WCDMA technology or an Evolved Packet Core (EPC) in the LTE/LTE-Advanced technology. The mobile communication device 310 comprises a wireless module 311 for performing the functionality of wireless transmissions and receptions to and from the service network 320, and a controller module 312 for controlling the operation of the wireless module 311 and other functional components, such as a display unit and/or keypad serving as the MMI (man-machine interface), a storage unit storing the program codes of applications or communication protocols, or others. To further clarify, the wireless module 311 may be a radio frequency (RF) unit, and the controller module 312 may be a general-purpose processor or a micro-control unit (MCU) of a baseband unit. The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communication system, wherein the radio frequency may be 900 MHz, 1900 MHz, or 2100 MHz utilized in WCDMA systems, or may be 900 MHz, 2100 MHz, or 2.6 GHz utilized in LTE/LTE-Advanced systems, or others depending on the Radio Access Technology (RAT) in use. Although not shown, there may be a subscriber identity card, such as a Subscriber Identity Module (SIM) card or a Universal Subscriber Identity Module (USIM) card, coupled in/to the mobile communication device 310. The subscriber identity card may be coupled to the controller module 312 via a card controller (not shown) for powering the subscriber identity card with voltage levels according to requirements thereof, or may be directly coupled to the controller module 312 via an interface provided by the controller module 312.

Figure 4:
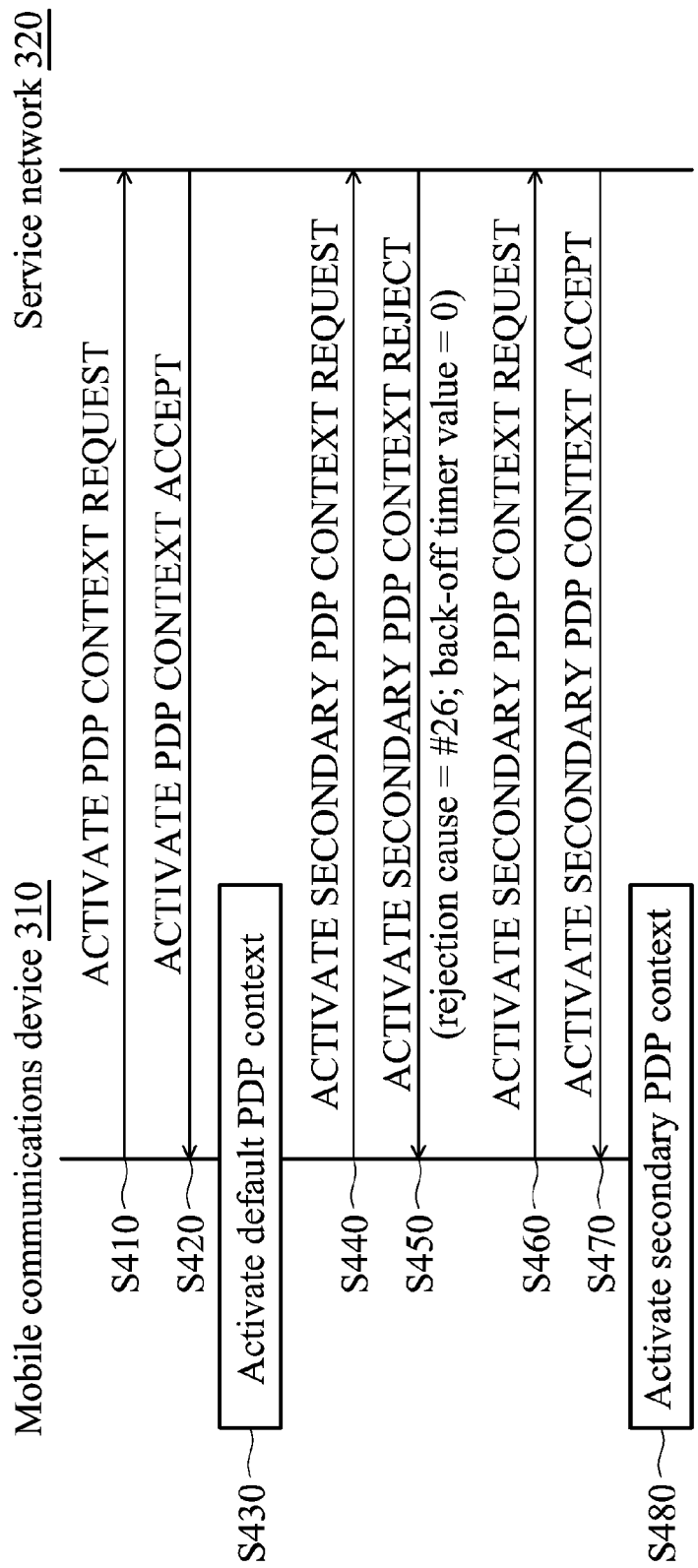
FIG. 4 is a message sequence chart illustrating an APN-based congestion control during an unsuccessful secondary PDP context activation procedure with a zero-valued back-off timer according to an embodiment of the invention.

To be more specific, the controller module 312 controls the wireless module 311 for performing APN-based congestion control during PDP context activation procedures. FIG. 4 is a message sequence chart illustrating an APN-based congestion control during an unsuccessful secondary PDP context activation procedure with a zero-valued back-off timer according to an embodiment of the invention. When a service access is required, the controller module 312 transmits an ACTIVATE PDP CONTEXT REQUEST message to the service network 320 via the wireless module 311 for requesting the activation of a default PDP context (step S410). As the service network 320 decides to accept the request, an APN is assigned for the requested PDP context and the controller module 312 receives an ACTIVATE PDP CONTEXT ACCEPT message from the service network 320 via the wireless module 311, which comprises the configurations for activating the default PDP context (step S420). In response to the request being accepted, the controller module 312 instructs the wireless module 311 to activate the default PDP context associated with the APN according to the received configurations (step S430). Later, when another service access associated with the APN is required, the controller module 312 transmits an ACTIVATE SECONDARY PDP CONTEXT REQUEST message to the service network 320 via the wireless module 311 for requesting the activation of a secondary PDP context (step S440). Due to the fact that the APN is congested, the service network 320 decides to reject the request and the controller module 312 receives an ACTIVATE SECONDARY PDP CONTEXT REJECT message from the service network 320 via the wireless module 311, which comprises a rejection cause with a cause value #26 (indicating insufficient resources) and a value of a back-off timer (step S450). In this embodiment, as the value of the back-off timer is zero, the controller module 312 is allowed to initiate any PDP context activation procedure so it retransmits the ACTIVATE SECONDARY PDP CONTEXT REQUEST message to the service network 320 via the wireless module 311 for requesting the activation of a secondary PDP context (step S460). At this time, the service network 320 decides to accept the request due to the fact that the APN congestion has been resolved, and the controller module 312 receives an ACTIVATE SECONDARY PDP CONTEXT ACCEPT message from the service network 320 via the wireless module 311, which comprises the configurations for activating the secondary PDP context (step S470). In response to the request being accepted, the controller module 312 instructs the wireless module 311 to activate the secondary PDP context associated with the APN according to the received configurations (step S480), and the procedure ends. In another embodiment, if the APN congestion persists when the retransmitted ACTIVATE SECONDARY PDP CONTEXT ACCEPT message is received, the service network 320 may reply to the mobile communication device 310 with an ACTIVATE SECONDARY PDP CONTEXT REJECT message instead, and the mobile communication device 310 may decide whether to repeat the PDP context activation procedure or wait a while before performing another PDP context activation procedure.

Figure 5:
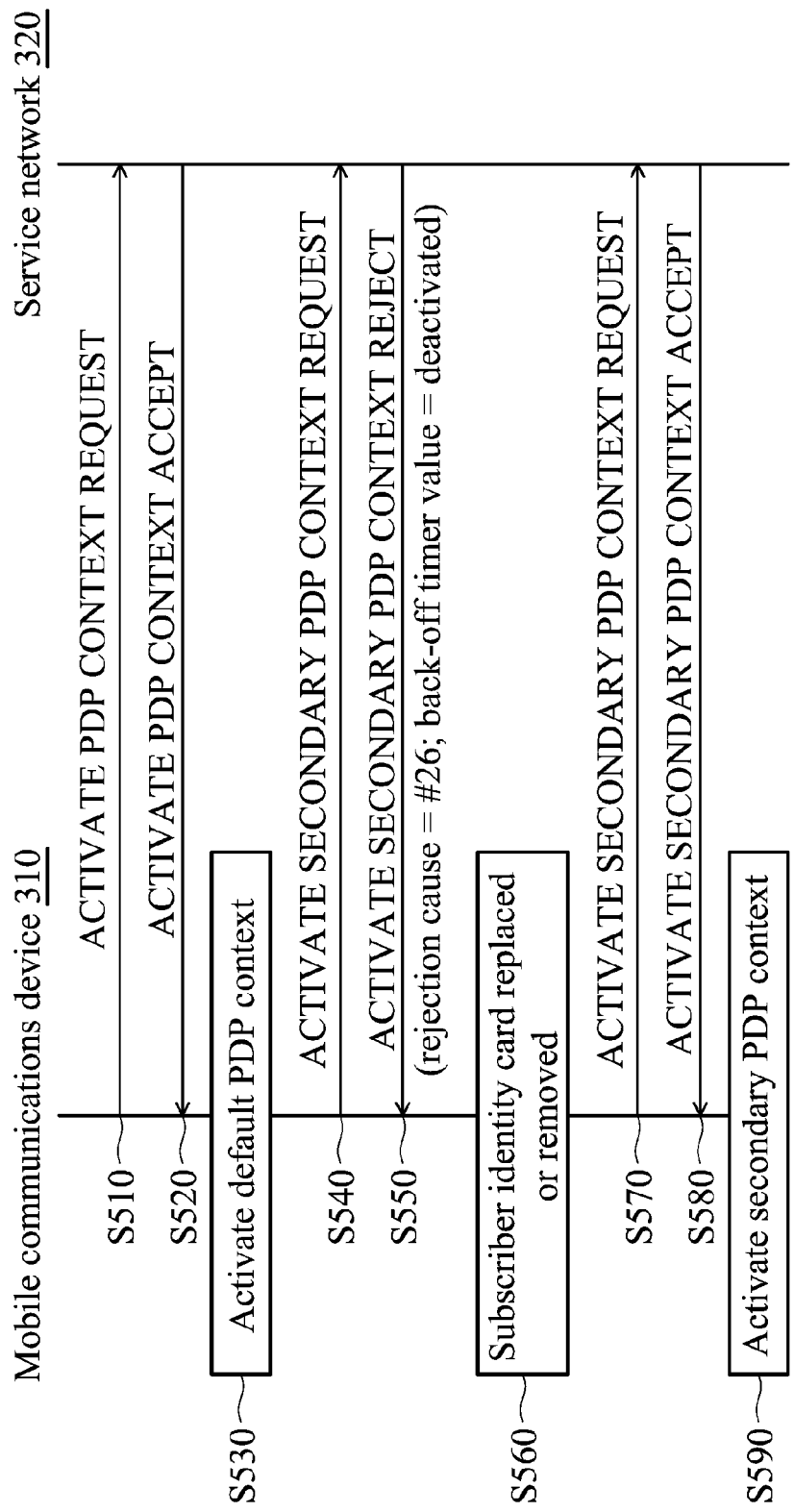
FIG. 5 is a message sequence chart illustrating an APN-based congestion control during an unsuccessful secondary PDP context activation procedure with a deactivated back-off timer according to an embodiment of the invention.

FIG. 5 is a message sequence chart illustrating an APN-based congestion control during an unsuccessful secondary PDP context activation procedure with a deactivated back-off timer according to an embodiment of the invention. Similar to FIG. 4, when a service access is required, the controller module 312 transmits an ACTIVATE PDP CONTEXT REQUEST message to the service network 320 via the wireless module 311 for requesting the activation of a default PDP context (step S510). As the service network 320 decides to accept the request, an APN is assigned for the requested PDP context and the controller module 312 receives an ACTIVATE PDP CONTEXT ACCEPT message from the service network 320 via the wireless module 311, which comprises the configurations for activating the default PDP context (step S520). In response to the request being accepted, the controller module 312 instructs the wireless module 311 to activate the default PDP context associated with the APN according to the received configurations (step S530). Later, when another service access associated with the APN is required, the controller module 312 transmits an ACTIVATE SECONDARY PDP CONTEXT REQUEST message to the service network 320 via the wireless module 311 for requesting the activation of a secondary PDP context (step S540). Due to the fact that the APN is congested, the service network 320 decides to reject the request and the controller module 312 receives an ACTIVATE SECONDARY PDP CONTEXT REJECT message from the service network 320 via the wireless module 311, which comprises a rejection cause with a cause value #26 (indicating insufficient resources) and a value of a back-off timer (step S550). In this embodiment, as the value of the back-off timer is set to a deactivated value, the controller module 312 is not allowed to initiate any PDP context activation procedure until the mobile communication device 310 is restarted or a subscriber identity card coupled in/to the mobile communication device 310 is replaced or removed. Later, when the subscriber identity card being replaced or removed (step S560), the controller module 312 retransmits the ACTIVATE SECONDARY PDP CONTEXT REQUEST message to the service network 320 via the wireless module 311 for requesting the activation of a secondary PDP context (step S570). At this time, the service network 320 decides to accept the request due to the fact that the APN congestion has been resolved, and the controller module 312 receives an ACTIVATE SECONDARY PDP CONTEXT ACCEPT message from the service network 320 via the wireless module 311, which comprises the configurations for activating the secondary PDP context (step S580). In response to the request being accepted, the controller module 312 instructs the wireless module 311 to activate the secondary PDP context associated with the APN according to the received configurations (step S590), and the procedure ends. In another embodiment, if the APN congestion persists when the retransmitted ACTIVATE SECONDARY PDP CONTEXT ACCEPT message is received, the service network 320 may reply to the mobile communication device 310 with an ACTIVATE SECONDARY PDP CONTEXT REJECT message instead, and the mobile communication device 310 may decide whether to repeat the PDP context activation procedure or wait a while before performing another PDP context activation procedure.

Figure 6:
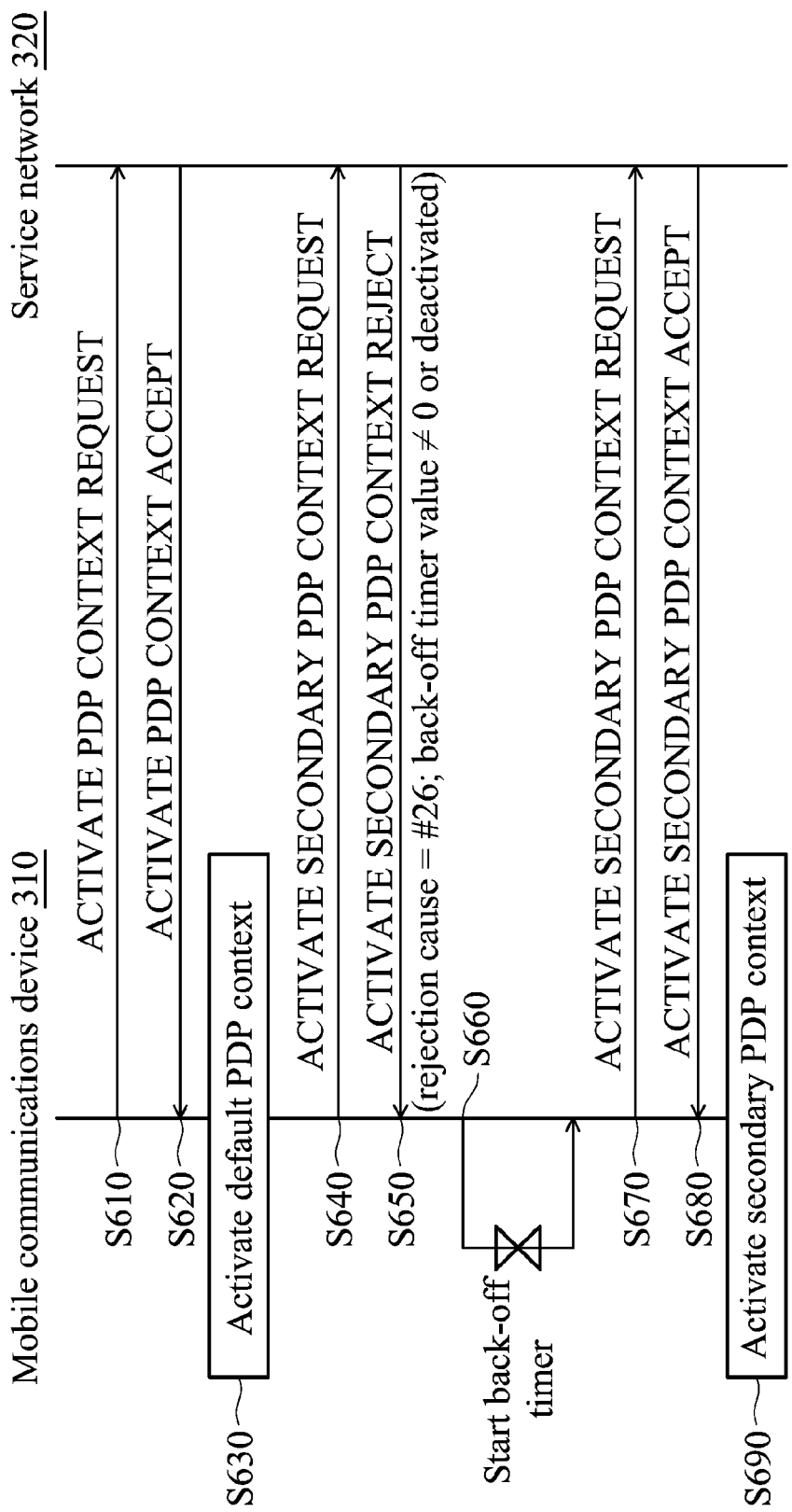
FIG. 6 is a message sequence chart illustrating an APN-based congestion control during an unsuccessful secondary PDP context activation procedure with a non-zero and non-deactivated valued back-off timer according to an embodiment of the invention.

FIG. 6 is a message sequence chart illustrating an APN-based congestion control during an unsuccessful secondary PDP context activation procedure with a non-zero and non-deactivated valued back-off timer according to an embodiment of the invention. Similar to FIG. 4, when a service access is required, the controller module 312 transmits an ACTIVATE PDP CONTEXT REQUEST message to the service network 320 via the wireless module 311 for requesting the activation of a default PDP context (step S610). As the service network 320 decides to accept the request, an APN is assigned for the requested PDP context and the controller module 312 receives an ACTIVATE PDP CONTEXT ACCEPT message from the service network 320 via the wireless module 311, which comprises the configurations for activating the default PDP context (step S620). In response to the request being accepted, the controller module 312 instructs the wireless module 311 to activate the default PDP context associated with the APN according to the received configurations (step S630). Later, when another service access associated with the APN is required, the controller module 312 transmits an ACTIVATE SECONDARY PDP CONTEXT REQUEST message to the service network 320 via the wireless module 311 for requesting the activation of a secondary PDP context (step S640). Due to the fact that the APN is congested, the service network 320 decides to reject the request and the controller module 312 receives an ACTIVATE SECONDARY PDP CONTEXT REJECT message from the service network 320 via the wireless module 311, which comprises a rejection cause with a cause value #26 (indicating insufficient resources) and a value of a back-off timer (step S650). In this embodiment, as the value of the back-off timer is not zero and not deactivated, the controller module 312 starts the back-off timer with the received value and is not allowed to initiate any PDP context activation procedure until the back-off timer expires (step S660). Later, after the back-off timer expires, the controller module 312 retransmits the ACTIVATE SECONDARY PDP CONTEXT REQUEST message to the service network 320 via the wireless module 311 for requesting the activation of a secondary PDP context (step S670). At this time, the service network 320 decides to accept the request due to the fact that the APN congestion has been resolved, and the controller module 312 receives an ACTIVATE SECONDARY PDP CONTEXT ACCEPT message from the service network 320 via the wireless module 311, which comprises the configurations for activating the secondary PDP context (step S680). In response to the request being accepted, the controller module 312 instructs the wireless module 311 to activate the secondary PDP context associated with the APN according to the received configurations (step S690), and the procedure ends. In another embodiment, if the APN congestion persists when the retransmitted ACTIVATE SECONDARY PDP CONTEXT ACCEPT message is received, the service network 320 may reply to the mobile communication device 310 with an ACTIVATE SECONDARY PDP CONTEXT REJECT message instead, and the mobile communication device 310 may decide whether to repeat the PDP context activation procedure or wait a while before performing another PDP context activation procedure.

Figure 7:
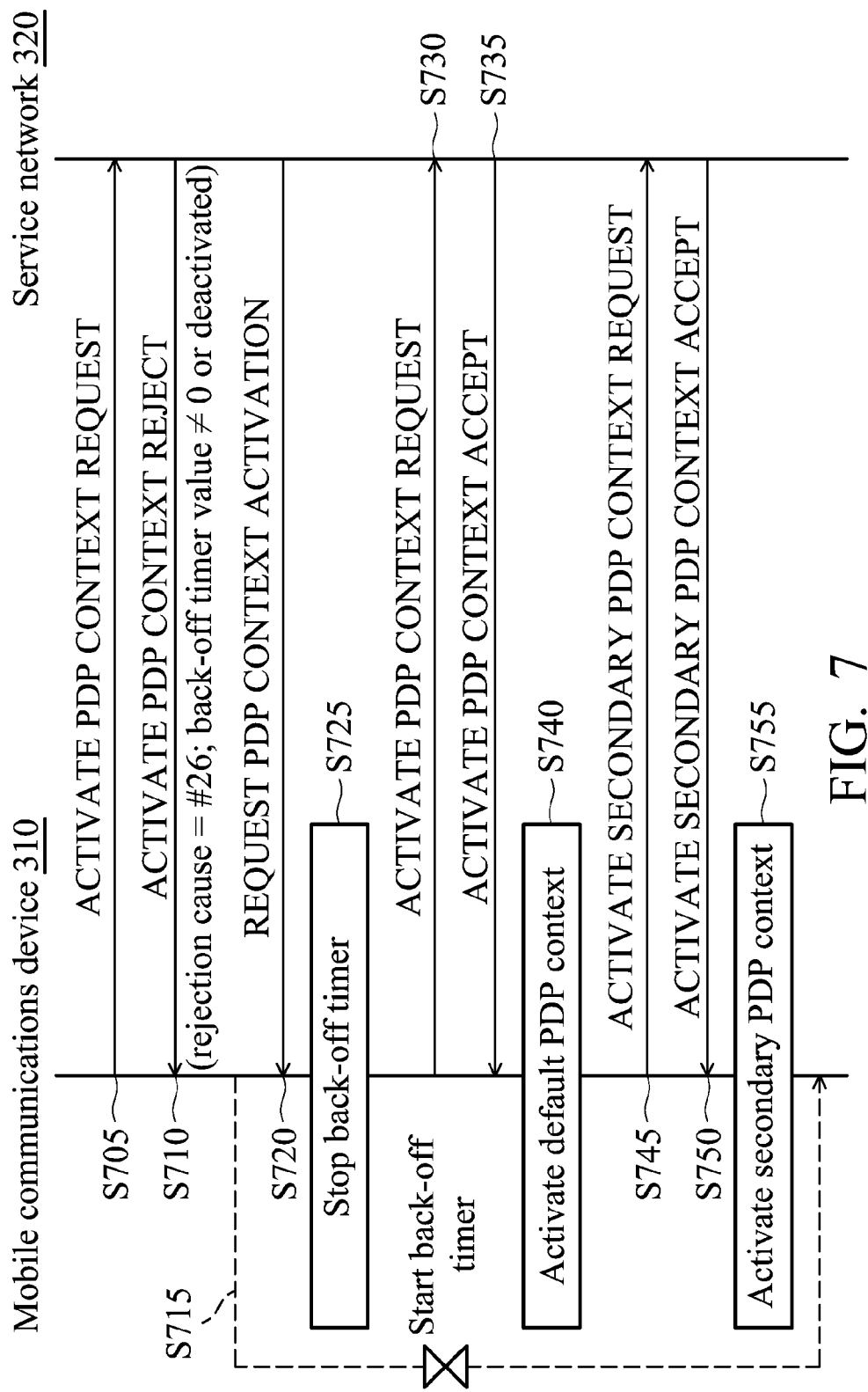
FIG. 7 is a message sequence chart illustrating an APN-based congestion control for a network-initiated PDP context activation procedure during a back-off timer running for the associated APN according to an embodiment of the invention.

FIG. 7 is a message sequence chart illustrating an APN-based congestion control for a network-initiated PDP context activation procedure during a back-off timer running for the associated APN according to an embodiment of the invention. When a service access is required, the controller module 312 transmits an ACTIVATE PDP CONTEXT REQUEST message to the service network 320 via the wireless module 311 for requesting the activation of a default PDP context (step S705). Due to the fact that the APN associated with the default PDP context is congested, the service network 320 decides to reject the request and the controller module 312 receives an ACTIVATE PDP CONTEXT REJECT message from the service network 320 via the wireless module 311, which comprises a rejection cause with a cause value #26 (indicating insufficient resources) and a value of a back-off timer (step S710). In this embodiment, as the value of the back-off timer is not zero and not deactivated, the controller module 312 starts the back-off timer with the received value and is not allowed to initiate any PDP context activation procedure until the back-off timer expires (step S715). However, during the running period of the back-off timer, the controller module 312 receives a REQUEST PDP CONTEXT ACTIVATION message from the service network 320 via the wireless module 311 for requesting the activation of a default PDP context associated with the APN by the mobile communication device 310 (step S720). In response to the REQUEST PDP CONTEXT ACTIVATION message, the controller module 312 stops the back-off timer (step S725) and retransmits the ACTIVATE PDP CONTEXT REQUEST message to the service network 320 via the wireless module 311 for requesting the activation of the default PDP context (step S730). At this time, the service network 320 decides to accept the request due to the fact that the request is made in response to the REQUEST PDP CONTEXT ACTIVATION message, and the controller module 312 receives an ACTIVATE PDP CONTEXT ACCEPT message from the service network 320 via the wireless module 311, which comprises the configurations for activating the default PDP context (step S735). In response to the request being accepted, the controller module 312 instructs the wireless module 311 to activate the default PDP context according to the received configurations (step S740), and the procedure ends. In this embodiment, since the back-off timer has been stopped, the controller module 312 is allowed to initiate any subsequent PDP context activation procedure for the APN. Later, when another service access associated with the APN is required, the controller module 312 transmits an ACTIVATE SECONDARY PDP CONTEXT REQUEST message to the service network 320 via the wireless module 311 for requesting the activation of a secondary PDP context (step S745). As the service network 320 decides to accept the request, the controller module 312 receives an ACTIVATE SECONDARY PDP CONTEXT ACCEPT message from the service network 320 via the wireless module 311; which comprises the configurations for activating the secondary PDP context (step S750). In response to the request being accepted, the controller module 312 instructs the wireless module 311 to activate the secondary PDP context associated with the APN according to the received configurations (step S755), and the procedure ends.

Figure 8:
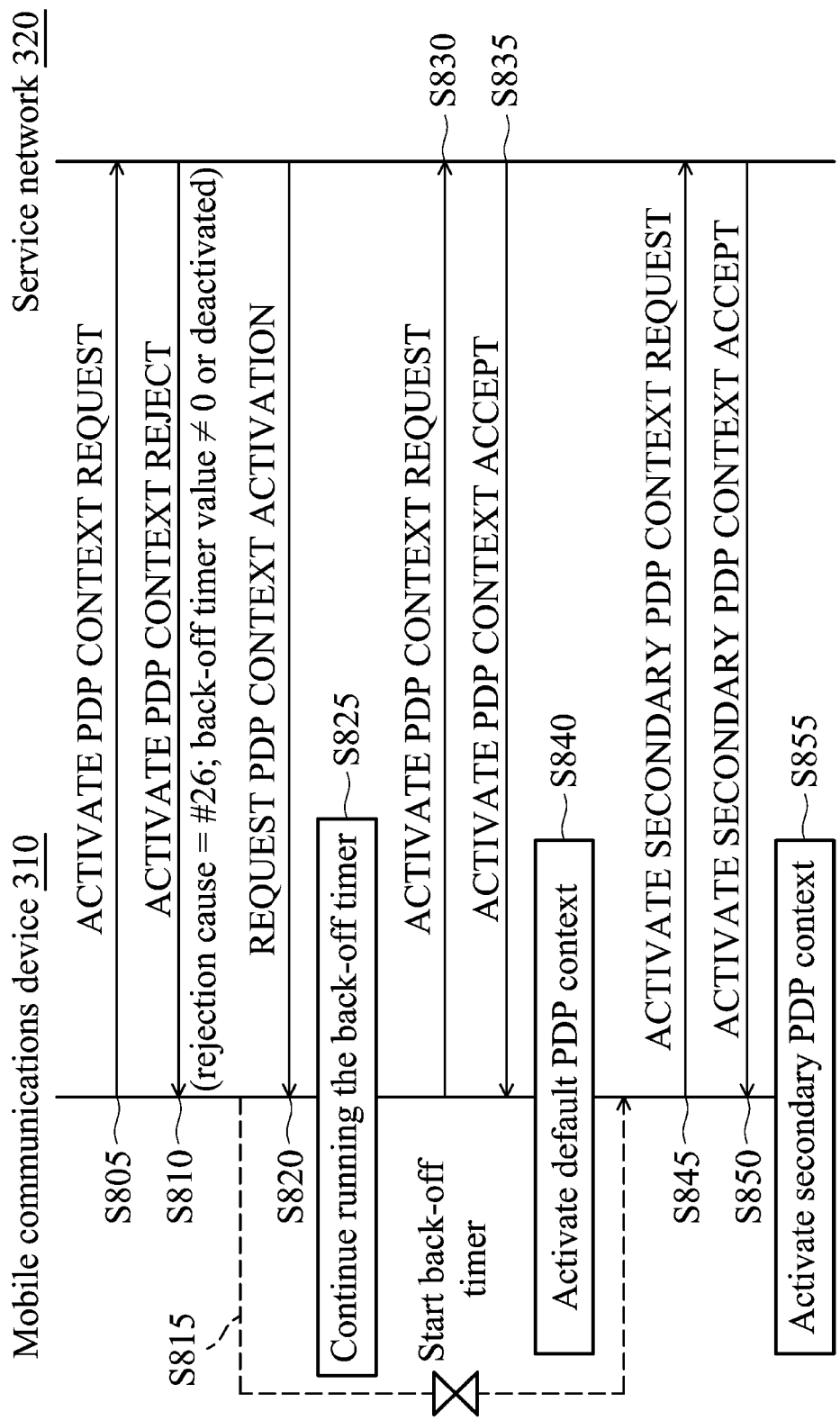
FIG. 8 is a message sequence chart illustrating an APN-based congestion control for a network-initiated PDP context activation procedure during a back-off timer running for the associated APN according to another embodiment of the invention.

FIG. 8 is a message sequence chart illustrating an APN-based congestion control for a network-initiated PDP context activation procedure during a back-off timer running for the associated APN according to another embodiment of the invention. Similar to FIG. 7, when a service access is required, the controller module 312 transmits an ACTIVATE PDP CONTEXT REQUEST message to the service network 320 via the wireless module 311 for requesting the activation of a default PDP context (step S805). Due to the fact that the APN associated with the default PDP context is congested, the service network 320 decides to reject the request and the controller module 312 receives an ACTIVATE PDP CONTEXT REJECT message from the service network 320 via the wireless module 311, which comprises a rejection cause with a cause value #26 (indicating insufficient resources) and a value of a back-off timer (step S810). In this embodiment, as the value of the back-off timer is not zero and not deactivated, the controller module 312 starts the back-off timer with the received value and is not allowed to initiate any PDP context activation procedure until the back-off timer expires (step S815). However, during the running period of the back-off timer, the controller module 312 receives a REQUEST PDP CONTEXT ACTIVATION message from the service network 320 via the wireless module 311 for requesting the activation of a default PDP context associated with the APN by the mobile communication device 310 (step S820). In response to the REQUEST PDP CONTEXT ACTIVATION message, the controller module 312 continues the running of the back-off timer (step S825) and retransmits the ACTIVATE PDP CONTEXT REQUEST message to the service network 320 via the wireless module 311 for requesting the activation of the default PDP context (step S830). At this time, the service network 320 decides to accept the request due to the fact that the request is made in response to the REQUEST PDP CONTEXT ACTIVATION message, and the controller module 312 receives an ACTIVATE PDP CONTEXT ACCEPT message from the service network 320 via the wireless module 311, which comprises the configurations for activating the default PDP context (step S835). In response to the request being accepted, the controller module 312 instructs the wireless module 311 to activate the default PDP context according to the received configurations (step S840), and the procedure ends. In this embodiment, since the back-off timer is still running, the controller module 312 is not allowed to initiate any subsequent PDP context activation procedure for the APN. Later, after the back-off timer expires and when another service access associated with the APN is required, the controller module 312 transmits an ACTIVATE SECONDARY PDP CONTEXT REQUEST message to the service network 320 via the wireless module 311 for requesting the activation of a secondary PDP context (step S845). As the service network 320 decides to accept the request, the controller module 312 receives an ACTIVATE SECONDARY PDP CONTEXT ACCEPT message from the service network 320 via the wireless module 311; which comprises the configurations for activating the secondary PDP context (step S850). In response to the request being accepted, the controller module 312 instructs the wireless module 311 to activate the secondary PDP context associated with the APN according to the received configurations (step S855), and the procedure ends.

Figure 9:
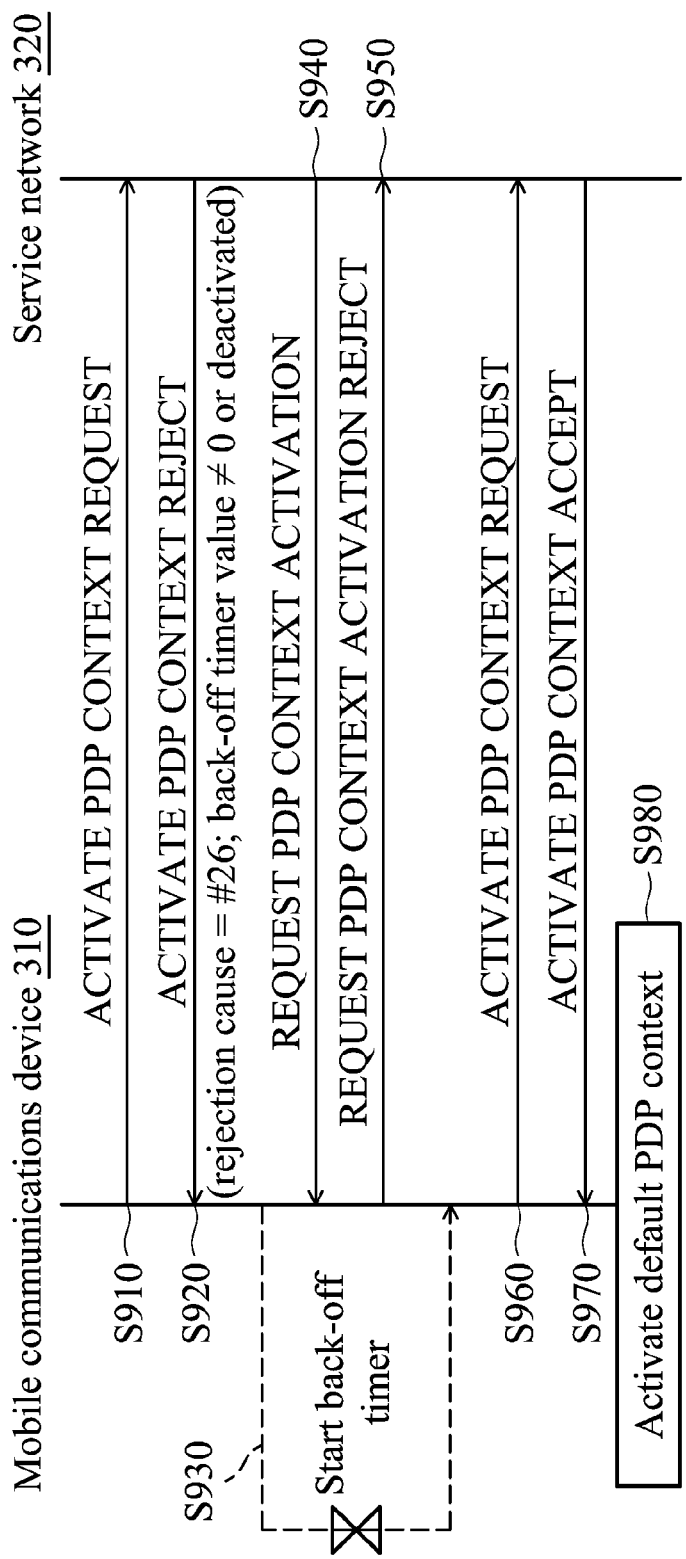
FIG. 9 is a message sequence chart illustrating an APN-based congestion control for a network-initiated PDP context activation procedure during a back-off timer running for the associated APN according to yet another embodiment of the invention.

FIG. 9 is a message sequence chart illustrating an APN-based congestion control for a network-initiated PDP context activation procedure during a back-off timer running for the associated APN according to yet another embodiment of the invention. Similar to FIG. 7, when a service access is required, the controller module 312 transmits an ACTIVATE PDP CONTEXT REQUEST message to the service network 320 via the wireless module 311 for requesting the activation of a default PDP context (step S910). Due to the fact that the APN associated with the default PDP context is congested, the service network 320 decides to reject the request and the controller module 312 receives an ACTIVATE PDP CONTEXT REJECT message from the service network 320 via the wireless module 311, which comprises a rejection cause with a cause value #26 (indicating insufficient resources) and a value of a back-off timer (step S920). In this embodiment, as the value of the back-off timer is not zero and not deactivated, the controller module 312 starts the back-off timer with the received value and is not allowed to initiate any PDP context activation procedure until the back-off timer expires (step S930). However, during the running period of the back-off timer, the controller module 312 receives a REQUEST PDP CONTEXT ACTIVATION message from the service network 320 via the wireless module 311 for requesting the activation of a default PDP context associated with the APN by the mobile communication device 310 (step S940). Since the back-off timer is still running, the controller module 312 is not allowed to create any PDP context so it transmits a REQUEST PDP CONTEXT ACTIVATION REJECT message to the service network 320 via the wireless module 311, which comprises a rejection cause (step S950). The rejection cause may be set to a cause value #31 (indicating activation rejected, unspecified), or may be set to a cause value indicating that the requested APN was congested and the back-off timer is still running. In another embodiment, the REQUEST PDP CONTEXT ACTIVATION REJECT message may further comprise the requested APN (i.e., the APN as received in the REQUEST PDP CONTEXT ACTIVATION message), and/or a timer Information Element (IE) indicating the remaining time of the back-off timer. Note that, in the case where the REQUEST PDP CONTEXT ACTIVATION REJECT message comprises the timer IE for indicating the remaining time of the back-off timer, the service network 320 does not initiate any network-initiated PDP context activation procedure until the remaining time of the back-off timer elapses. Later, after the back-off timer expires and when another service access associated with the APN is required, the controller module 312 transmits an ACTIVATE SECONDARY PDP CONTEXT REQUEST message to the service network 320 via the wireless module 311 for requesting the activation of a secondary PDP context (step S960). As the service network 320 decides to accept the request, the controller module 312 receives an ACTIVATE SECONDARY PDP CONTEXT ACCEPT message from the service network 320 via the wireless module 311; which comprises the configurations for activating the secondary PDP context (step S970). In response to the request being accepted, the controller module 312 instructs the wireless module 311 to activate the secondary PDP context associated with the APN according to the received configurations (step S980), and the procedure ends.

Figure 10:
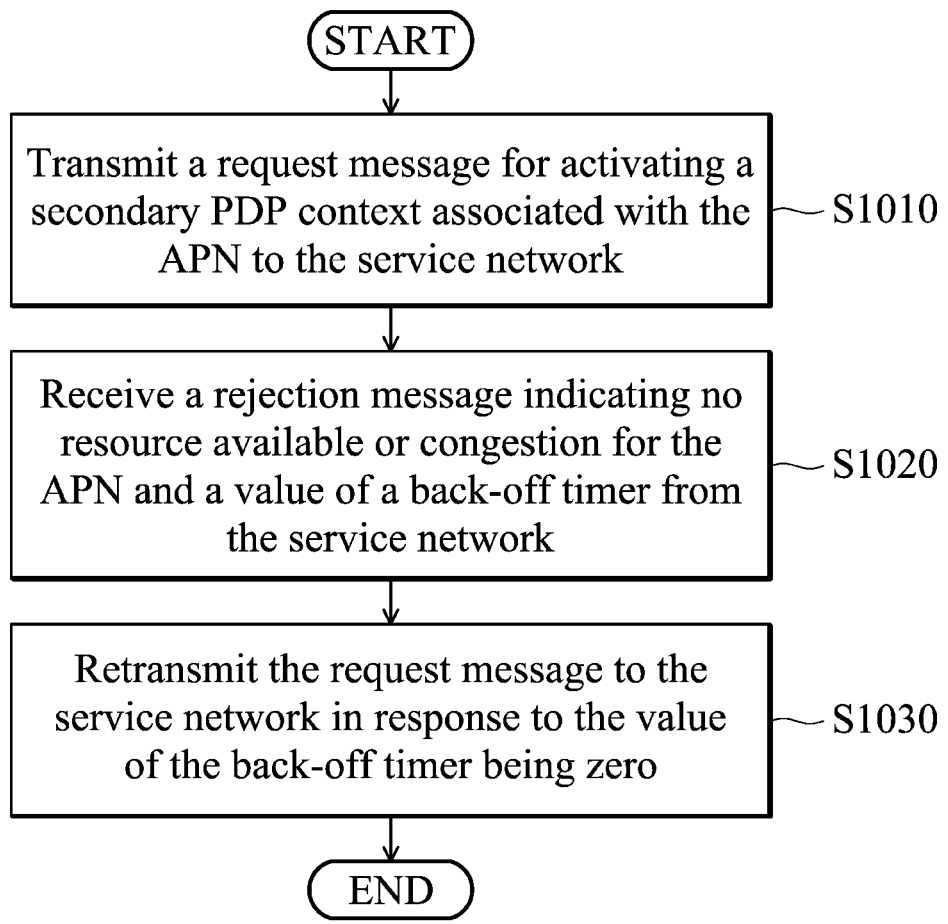
FIG. 10 is a flow chart illustrating an APN-based congestion control method according to an embodiment of the invention.

FIG. 10 is a flow chart illustrating an APN-based congestion control method according to an embodiment of the invention. In this embodiment, the APN-based congestion control method may be applied in any mobile communication device wirelessly connected to a service network with a default PDP context active for an APN. To begin the APN-based congestion control method, the mobile communication device transmits a request message for activating a secondary PDP context associated with the APN to the service network (step S1010). After that, the mobile communication device receives a rejection message indicating no resource available or congestion for the APN and a value of a back-off timer from the service network (step S1020). Specifically, the request message may be an ACTIVATE SECONDARY PDP CONTEXT REQUEST message and the rejection message may be an ACTIVATE SECONDARY PDP CONTEXT REJECT message in the WCDMA/LTE/LTE-Advanced technology. In response to the value of the back-off timer being zero, the mobile communication device retransmits the request message to the service network (step S1030). In another embodiment, if the value of the back-off timer is deactivated, the mobile communication device is not allowed to initiate any PDP context activation procedure until the mobile communication device is restarted or a subscriber identity card coupled in/to the mobile communication device is replaced or removed. In yet another embodiment, if the value of the back-off timer is non-zero and non-deactivated, the mobile communication device starts the back-off timer with the received value and is not allowed to initiate any PDP context activation procedure until the back-off timer expires.

Figure 11:
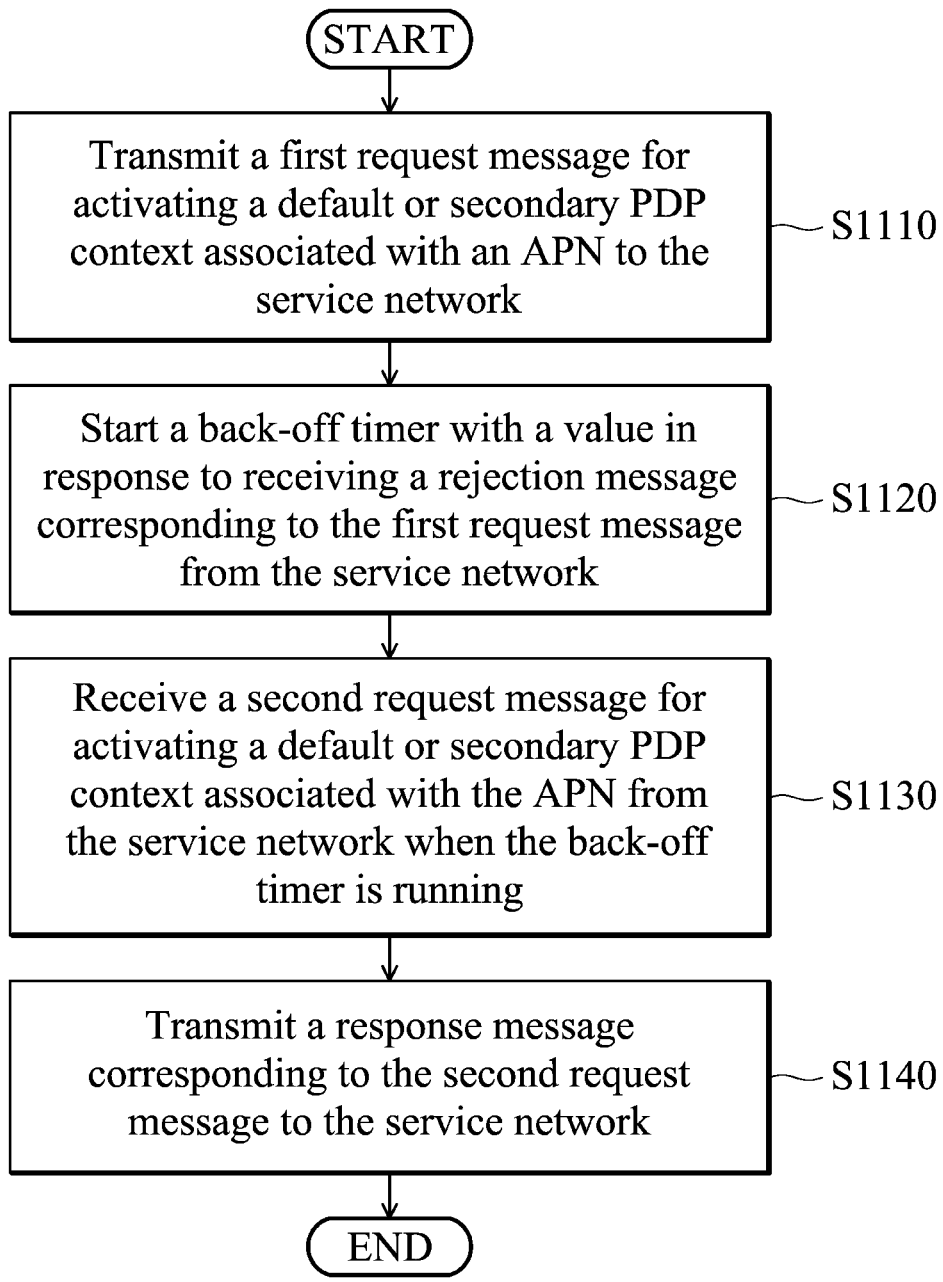
FIG. 11 is a flow chart illustrating an APN-based congestion control method according to another embodiment of the invention.

FIG. 11 is a flow chart illustrating an APN-based congestion control method according to another embodiment of the invention. In this embodiment, the APN-based congestion control method may be applied in any mobile communication device during a PDP context activation procedure. To begin the APN-based congestion control method, the mobile communication device transmits a first request message for activating a default or secondary PDP context associated with an APN to the service network (step S1110), and then starts a back-off timer with a value in response to receiving a rejection message corresponding to the first request message from the service network (step S1120). Specifically, the first request message may be an ACTIVATE PDP CONTEXT REQUEST message or an ACTIVATE SECONDARY PDP CONTEXT REQUEST message, and the rejection message may be an ACTIVATE PDP CONTEXT REJECT message or an ACTIVATE SECONDARY PDP CONTEXT REJECT message in the WCDMA/LTE/LTE-Advanced technology. Subsequently, the mobile communication device receives a second request message for activating a default or secondary PDP context associated with the APN from the service network when the back-off timer is running (step S1130). Specifically, the second request message may be a REQUEST PDP CONTEXT ACTIVATION message or a REQUEST SECONDARY PDP CONTEXT ACTIVATION message. After that, the mobile communication device transmits a response message corresponding to the second request message to the service network (step S1140). In one embodiment, the response message may be the first request message retransmitted, and the running of the back-off timer may be stopped or continued. If the running of the back-off timer is stopped, the mobile communication device may initiate any PDP context activation procedure whenever required. Otherwise, if the running of the back-off timer is continued, the mobile communication device may not proactively initiate any PDP context activation procedure until the back-off timer expires. In another embodiment, the response message may be rejection message, and specifically, the rejection message may be a REQUEST PDP CONTEXT ACTIVATION REJECT message or a REQUEST SECONDARY PDP CONTEXT ACTIVATION REJECT message in the WCDMA/LTE/LTE-Advanced technology. The rejection message may comprise any combination of a rejection cause, the requested APN, and a timer IE which indicates the remaining time of the back-off timer.

While the invention has been described by way of example and in terms of preferred embodiment, it is to be understood that the invention is not limited thereto. Those who are skilled in this technology can still make various alterations and modifications without departing from the scope and spirit of this invention. For example, the method for handling measurement logging configuration may be also applied for mobile communication devices and service networks in compliance with any evolutionary technology of the WCDMA/LTE/LTE-Advanced technology. Therefore, the scope of the present invention shall be defined and protected by the following claims and their equivalents.

What is claimed is:

1. A mobile communication device, comprising:
a wireless module performing wireless transmissions and receptions to and from a service network; and
a controller module transmitting a first request message for activating a default or secondary PDP context associated with an APN to the service network via the wireless module, starting a back-off timer with a value in response to receiving a rejection message corresponding to the first request message from the service network via the wireless module, receiving a second request message for activating a default or secondary PDP context associated with the APN from the service network via the wireless module when the back-off timer is running, and stopping the back-off timer and transmitting a response message corresponding to the second request message to the service network via the wireless module.

2. The mobile communication device of claim 1, wherein the controller module further transmits a third request message for activating another default or secondary PDP context associated with the APN to the service network via the wireless module after the back-off timer has been stopped.

3. The mobile communication device of claim 1, wherein the controller module does not initiate any PDP context activation procedure associated with the APN in response to the response message being a rejection message comprising a rejection cause.

4. The mobile communication device of claim 3, wherein the rejection cause indicates an unspecified cause, and the rejection message further comprises one or both of the APN and a timer Information Element (IE) indicating the remaining time of the back-off timer.

5. The mobile communication device of claim 4, wherein the service network does not initiate any PDP context activation procedure associated with the APN in response to receiving the response message until the remaining time of the back-off timer has elapsed.

6. The mobile communication device of claim 3, wherein the rejection cause indicates that the APN is congested and the back-off timer is still running, and the rejection message further comprises the APN.

7. An APN-based congestion control method for a mobile communication device during a PDP context activation procedure, the APN-based congestion control method comprising:
transmitting a first request message for activating a default or secondary PDP context associated with an APN to the service network;
starting a back-off timer with a value in response to receiving a rejection message corresponding to the first request message from the service network;
receiving a second request message for activating a default or secondary PDP context associated with the APN from the service network when the back-off timer is running; and
stopping the back-off timer and transmitting a response message corresponding to the second request message to the service network.

8. The method of claim 7, further comprising transmitting a third request message for activating another default or secondary PDP context associated with the APN to the service network via the wireless module after the back-off timer has been stopped.

9. The method of claim 7, further comprising not initiating any PDP context activation procedure associated with the APN in response to the response message being a rejection message comprising a rejection cause.

10. The method of claim 9, wherein the rejection cause indicates an unspecified cause, and the rejection message further comprises one or both of the APN and a timer Information Element (IE) indicating the remaining time of the back-off timer.

11. The method of claim 10, wherein the service network does not initiate any PDP context activation procedure associated with the APN in response to receiving the response message until the remaining time of the back-off timer has elapsed.

12. The method of claim 9, wherein the rejection cause indicates that the APN is congested and the back-off timer is still running, and the rejection message further comprises the APN.

* * * * *